United States Patent [19]

Bernard, II et al.

[11] 4,027,833

[45] June 7, 1977

[54] ARTICLE TRANSFER SYSTEM

[75] Inventors: Clay Bernard, II; William F. Matheny, III; Billy J. Parker, all of Tulsa, Okla.

[73] Assignee: Clay Bernard Systems International Ltd., Tulsa, Okla.

[22] Filed: Feb. 23, 1976

[21] Appl. No.: 660,160

[52] U.S. Cl. .................. 243/31; 193/31 A; 243/38

[51] Int. Cl.² .................................. B65G 51/24

[58] Field of Search ............ 243/1, 16 R, 16 M, 19, 243/29, 31, 36, 38; 193/31 R, 31 A, 23; 209/74 R; 198/366, 369, 348, 349, 358, 362

[56] References Cited

UNITED STATES PATENTS

| 2,712,910 | 7/1955 | Goerlich | 243/29 X |
|---|---|---|---|
| 2,797,057 | 6/1957 | Sindzinski et al. | 243/16 R |
| 3,265,327 | 8/1966 | Mach | 243/29 |
| 3,295,662 | 1/1967 | Crosby et al. | 243/16 X |
| 3,302,904 | 2/1967 | Buchwald | 243/29 |
| 3,333,787 | 8/1967 | Voitas et al. | 243/16 R |

FOREIGN PATENTS OR APPLICATIONS

| 662,034 | 4/1965 | Belgium | 243/29 |
|---|---|---|---|
| 665,674 | 9/1938 | Germany | 243/29 |
| 1,201,772 | 9/1965 | Germany | 243/29 |

Primary Examiner—Evon C. Blunk
Assistant Examiner—James L. Rowland
Attorney, Agent, or Firm—William S. Dorman

[57] ABSTRACT

A device for transferring article carriers from one carrier tube of a pneumatic transfer system to another carrier tube provided by a hopper movable along a guide. A plurality of gated incoming carrier tubes are positioned above the hopper. When the slide gate of an incoming tube containing a carrier is opened, the carrier is dropped into the hopper positioned below. A plurality of gated outgoing carrier tubes are positioned below the movable hopper for receiving the carrier dropped from the hopper when a hopper gate is opened and the slide gate of the desired outgoing carrier tube is opened.

20 Claims, 11 Drawing Figures

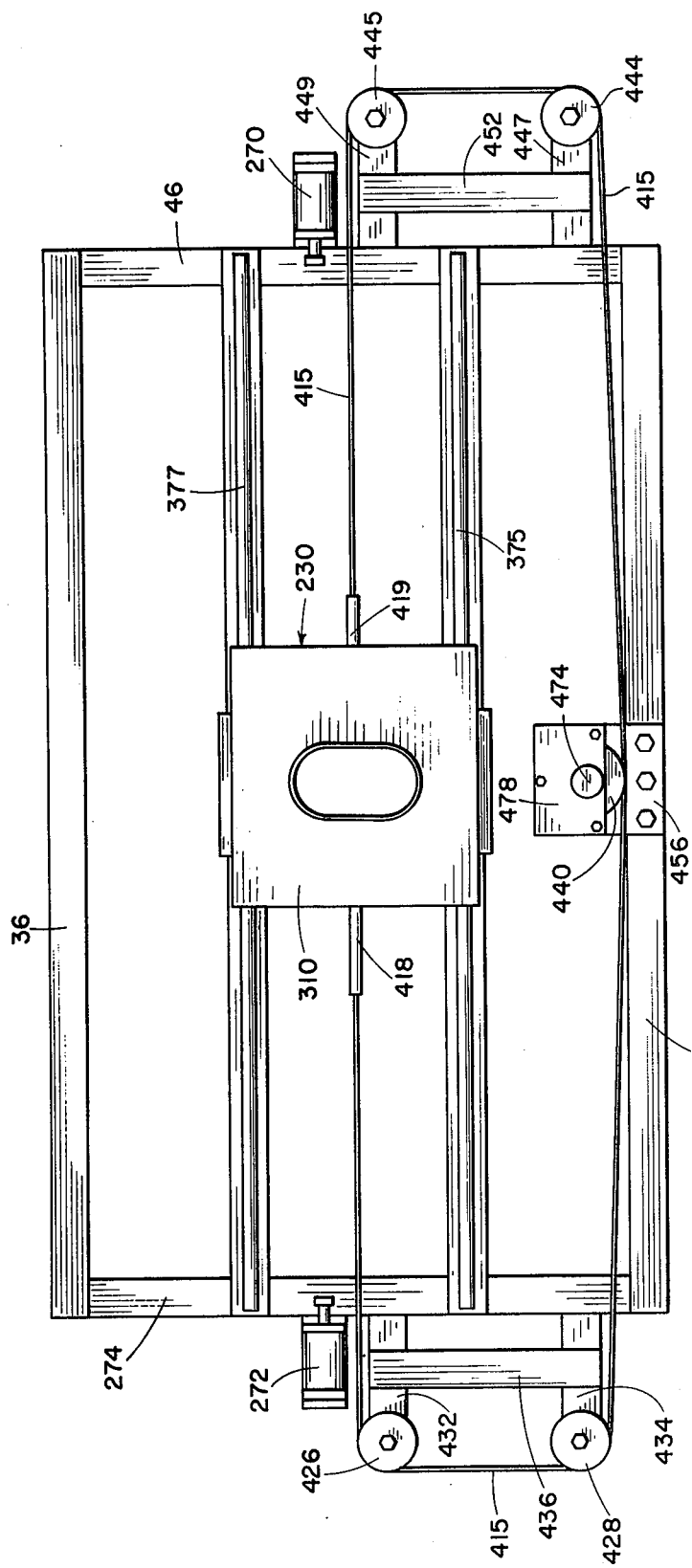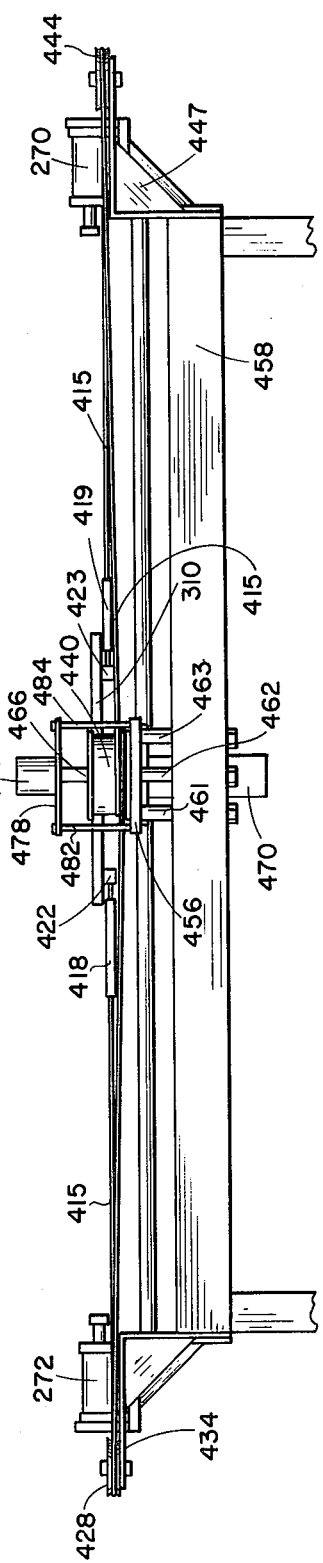

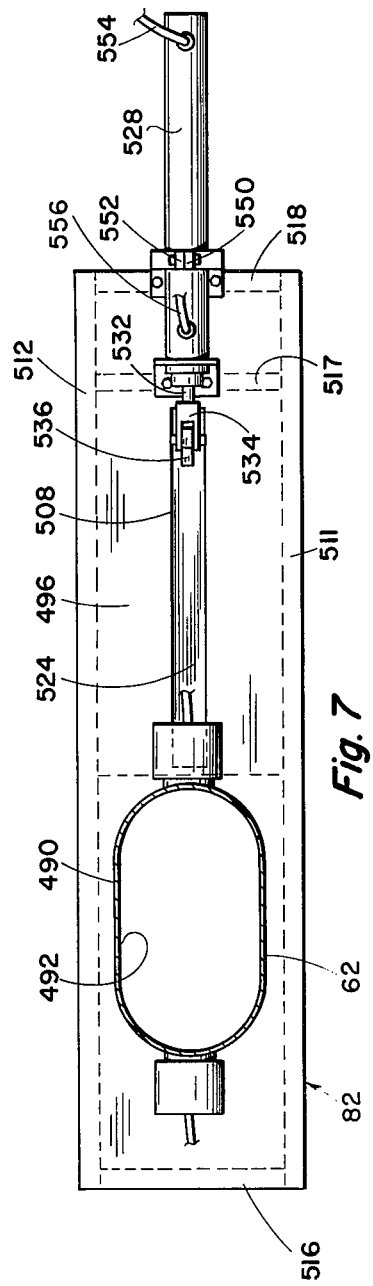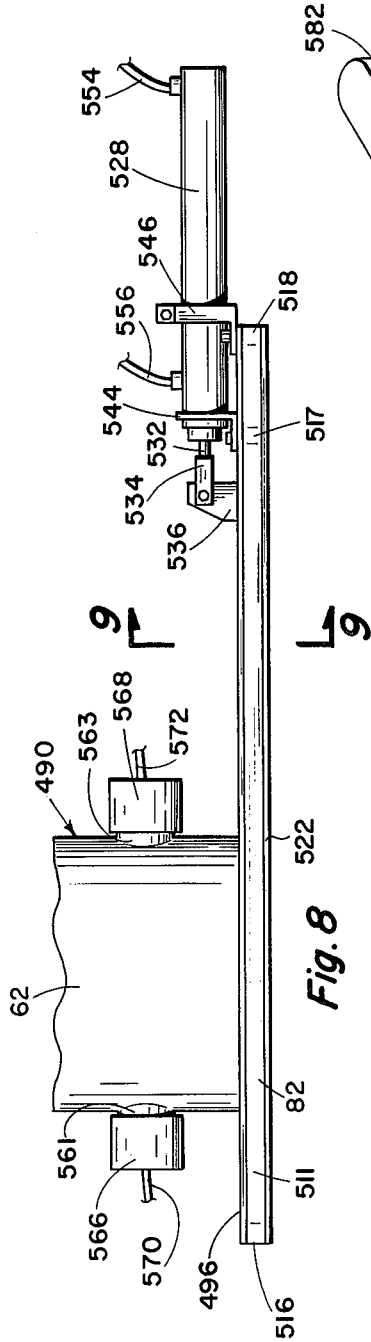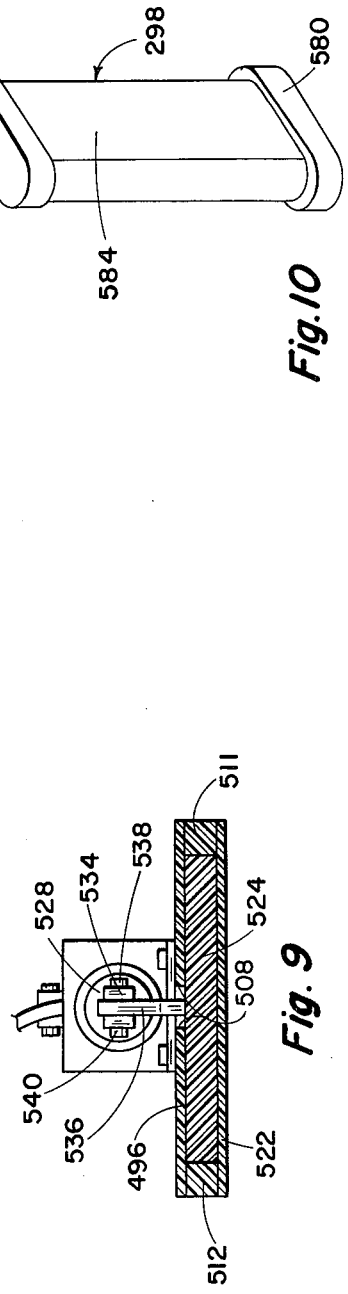

4,027,833

ARTICLE TRANSFER SYSTEM

BACKGROUND OF THE INVENTION

1. Field of the Invention

The present invention relates to an article transfer system for transferring article carriers from one pneumatic tube to another. More particularly, the present invention relates to an article transfer system which utilizes a hopper mounted on a guide to move the carrier from an incoming carrier tube to the proper outgoing carrier tube.

2. Description of the Prior Art

Reference is made to the following U.S. patents as typifying the structure of article transfer systems: Goerlich; U.S. Pat. No. 2,712,910; Buchwald; U.S. Pat. No. 3,302,904; and Mach; U.S. Pat. No. 3,265,327.

The Goerlich patent shows and describes an article transfer system which utilizes a conveyor belt for transferring the article carriers from the incoming carrier tubes to the outgoing carrier tubes. The carriers move from the incoming carrier tubes and are attached to the conveyor belt. The article carriers remain attached to the conveyor belt until they are released from the conveyor belt and move into the proper outgoing carrier tube. The Buchwald patent shows and describes an article transfer system or branch-off facility which utilizes a funnel and three slides to accomplish the transfer procedure. The funnel is positioned beneath the incoming carrier tubes and is rotatable about an axis. The carriers fall from the incoming carrier tubes into the funnel and are directed to one of three slides by rotating the funnel. The slides which are tied together are rotatable about an axis perpendicular to that about which the funnel rotates. The carrier can be directed toward a plurality of outgoing carrier tubes located below the slides by the rotation of the slides. The Mach patent shows a similar arrangement, but utilizes two rotatable funnels. One funnel is disposed above the other.

These prior constructions did not maintain strict control over the carrier during the transfer process. Therefore, the carrier might suffer a dislocation within the device and not arrive at its proper outgoing tube. Also, these constructions generally required that the entire transfer system be enclosed and airtight.

SUMMARY OF THE INVENTION

The present invention involves an article transfer system having a series of guides, for example, rods, disposed horizontally on a frame. A slideable hopper is attached to the guides. A plurality of incoming carrier tubes is attached to the frame above the hopper so that the hopper may be moved to a position directly below each incoming carrier tube individually. A plurality of outgoing carrier tubes is attached to the frame below the guides so that the hopper may be moved to a position directly above each outgoing carrier tube individually.

The ends of the incoming and outgoing carrier tubes and the bottom of the hopper are gated. The opening and closing of the slide gates is sequenced with the arrival of carriers and the movements of the hopper along the guides to prevent more than one carrier at a time from entering the transfer area surrounding the hopper.

A hydraulic valve operating in conjunction with a hydraulic motor is connected to the hopper to position it at a particular location along the guides as necessary.

The sequence of events involved in the transfer of a carrier is that the carrier arrives at the end of an incoming carrier tube resting on the slide gate thereof. The hopper is positioned just below the incoming tube containing a carrier. The slide gate of the incoming tube then opens allowing the carrier to drop into the hopper. The hydraulic motor then moves the hopper to a position just above that desired outgoing carrier tube, allowing the carrier to drop from the hopper into the outgoing carrier tube. The gates then close. The carrier continues through the outgoing tube to its proper destination. The hopper, once the hopper gate is closed, is ready to be positioned below another incoming tube containing a carrier and to repeat the above operation.

BRIEF DESCRIPTION OF THE DRAWINGS

FIG. 3 is a front view of the positioning apparatus constructed according to the present invention;

FIG. 4 is a top view of the positioning apparatus shown in FIG. 3;

FIG. 7 is a top view of a carrier tube slide gate constructed according to the present invention;

FIG. 8 is a side view of the slide gate shown in FIG. 7;

FIG. 9 is a cross sectional view of the slide gate taken along section line 9—9 of FIG. 8;

FIG. 10 is a view in perspective of an article carrier; and

DESCRIPTION OF THE PREFERRED EMBODIMENT

Figure 1:
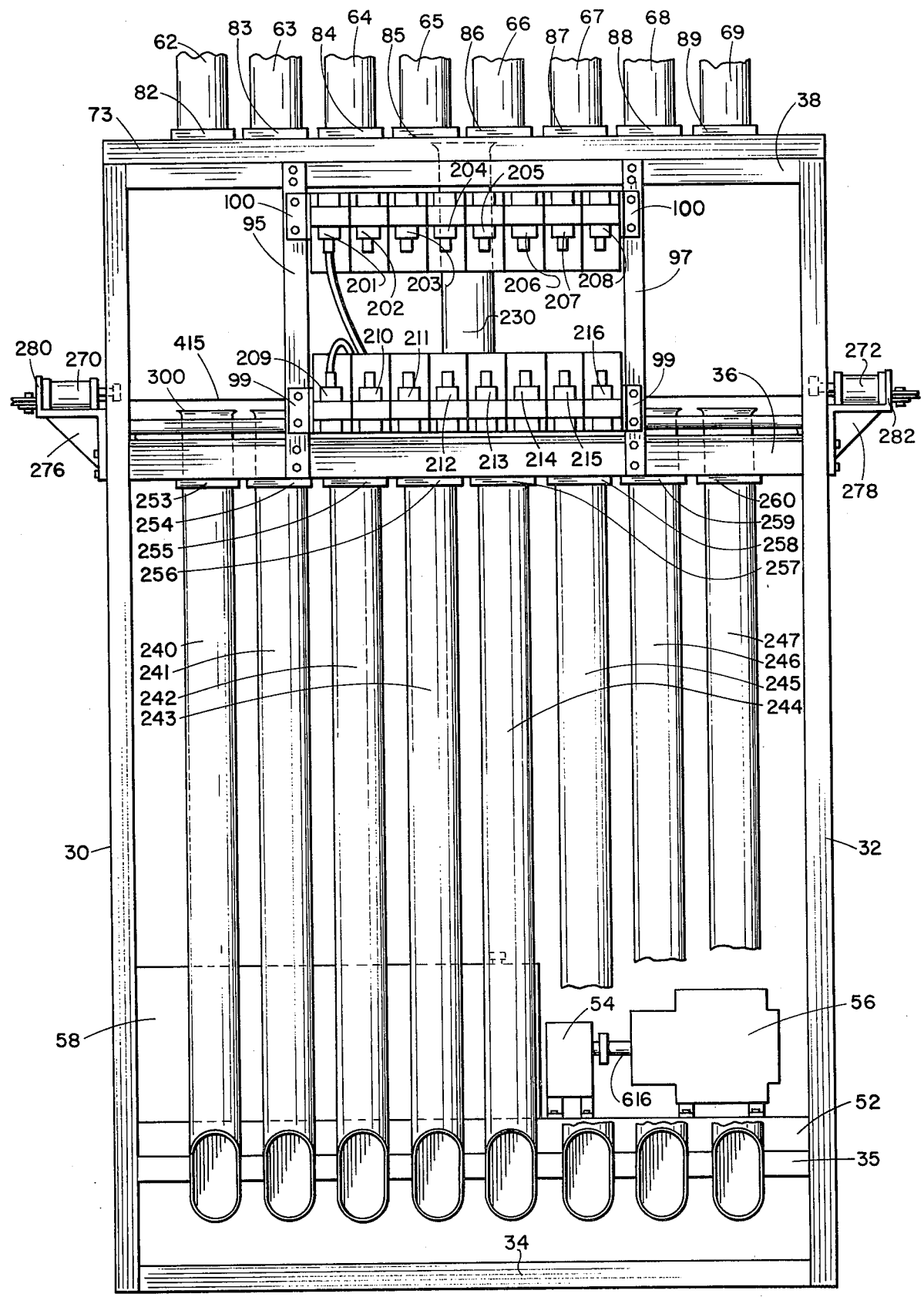
FIG. 1 is a front view of an article transfer system constructed according to the present invention.

The article transfer system has a frame or cabinet which is basically a box-like shape standing on one end with beams running vertically and horizontally. The front of the article transfer system frame (shown in FIG. 1) is a rectangular shape comprised of vertical beams 30 and 32 and cross beams 34,35,36 and 38. The rear portion of the frame (all of which is not shown in detail) is a similar rectangular shape. Vertical beam 40 of the rear portion of the frame is shown in FIG. 2. The side beams 42,44,46 and 48 connect the front and rear portions of the frame on one side of the frame. Similar side beams connect the front and rear portions of the frame together at the opposite side (not shown in FIGS. 1 and 2).

Various plates could be provided for the mounting of equipment on the frame. For example, mounting plate 52 extends from side beam 44 (FIG. 2) to its opposite side beam (not shown) and is attached to the cross beam 35 along its length. Mounting plate 52 is provided for the mounting of an electrical motor 54, a compresser 56 and an oil storage tank or sump 58 (to be discussed in detail hereinafter).

Figure 2:
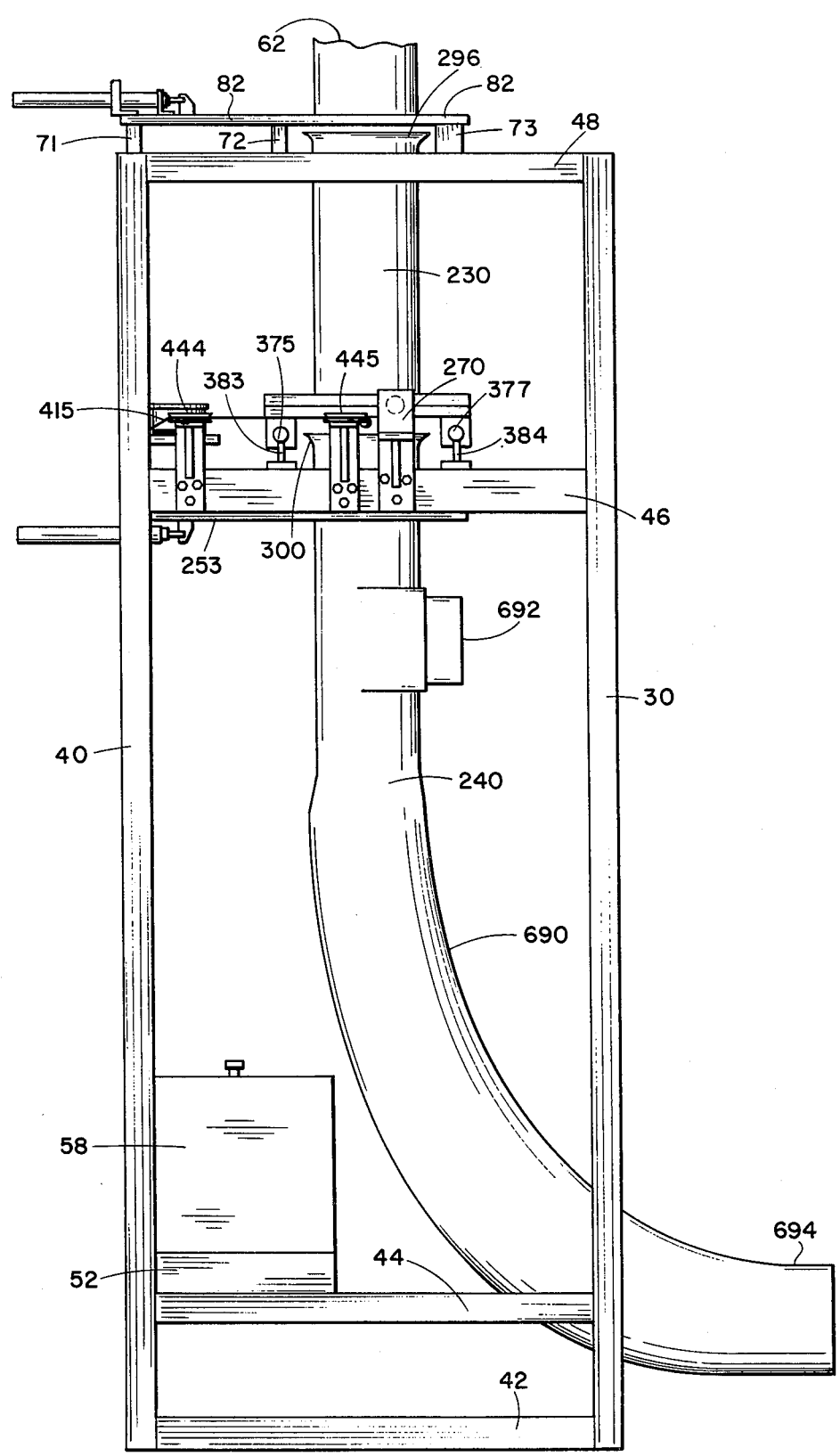
FIG. 2 is a side view of the article transfer system shown in FIG. 1.

The incoming carrier tubes 62 through 69 are shown in FIG. 1 positioned at the top of the frame adjacent to beams 71,72 and 73 (FIG. 2). Just below the incoming carrier tubes 62 through 69 are attached their associated slide gates 82 through 89, respectively (to be discussed in detail hereinafter). The incoming carrier tubes have a basically elongated elliptical shape having two half circles connected by parallel straight lines.

Two vertical strips 95 and 97 are attached between cross beams 36 and 38. Strips 99 and 100 are horizontally attached to vertical strips 95 and 97 just above cross beam 36 and just below cross beam 38, respectively. Attached to the strips 99 and 100 are the two position solenoid valves 201 through 216 which actuate the slide gates (to be discussed in detail hereinafter).

Just below the hopper 130 (to be discussed in detail hereinafter) are located the basically elliptical (as discussed above) outgoing carrier tubes 240 through 247. The outgoing carrier tubes 240 through 247 have been cross sectioned a short distance below the top thereof, and slide gates 253 through 260, respectively, have been inserted therein.

Also shown in FIG. 1 are shock absorbers 270 and 272 which are attached to side beams 46 and 274, respectively, (as shown in FIG. 4) by braces. The L-shaped braces 276 and 278 (with a triangular piece for added strength between the arms of the brace) are attached to their respective side beams 46 and 274 by some standard method such as nuts and bolts. Shock absorbers 270 and 272 are attached to their respective braces 276 and 278 by some standard method such as nuts and bolts. Brace 276 has a vertical ear 280 which extends upward from the main body of the brace 276. Brace 276 rests against the rear of shock absorber 270 and acts as a backstop for shock absorber 270 to maintain shock absorber 270 in the proper alignment with hopper 230 (to be discussed in detail hereinafter). Brace 278 has a similar vertical ear 282 which acts as a backstop for shock absorber 272 and performs the same function as vertical ear 280 for maintaining shock absorber 272 in the proper alignment with hopper 230.

Figure 5:
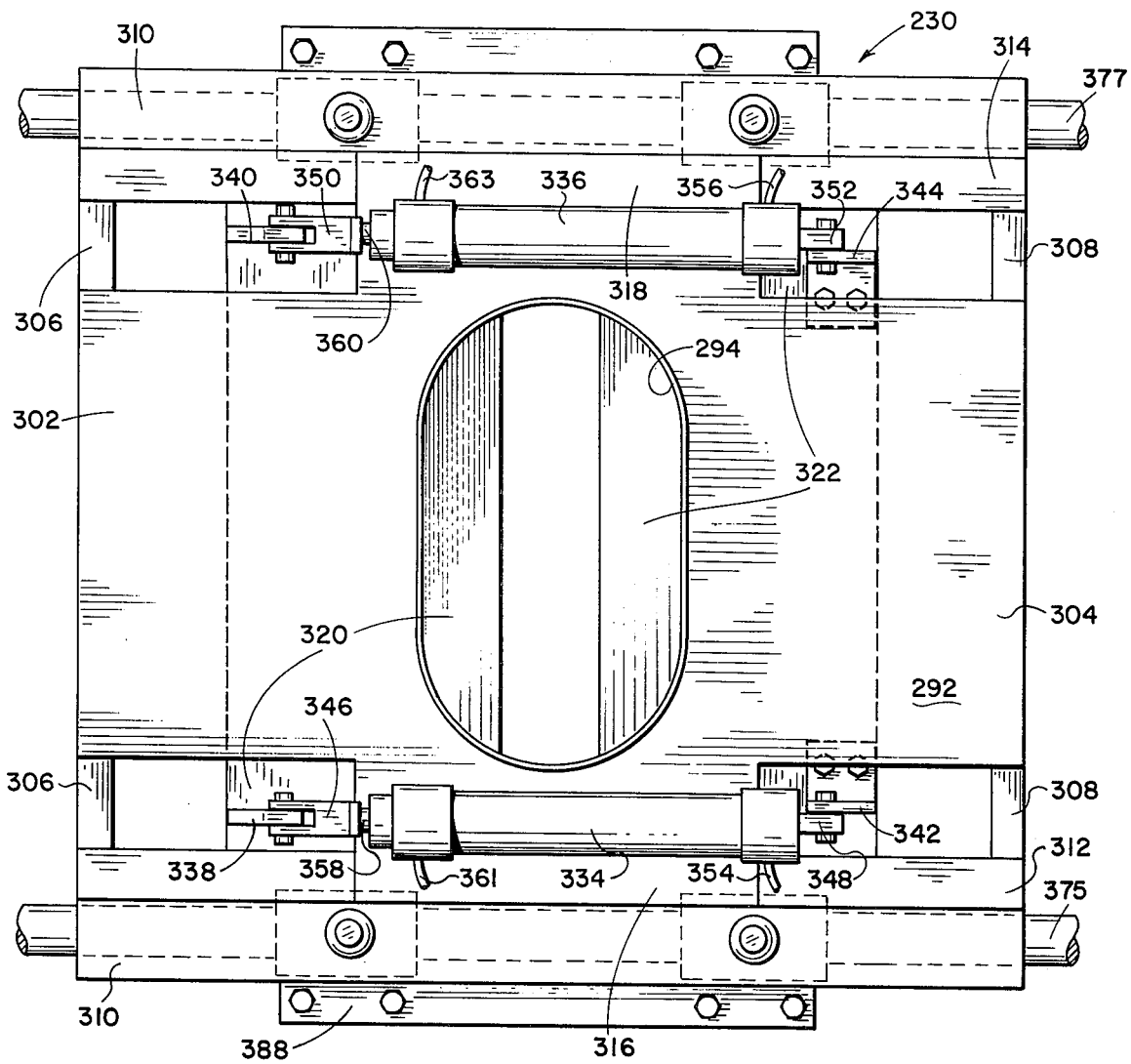
FIG. 5 is a detailed top view of a hopper and hopper gate constructed according to the present invention.
Figure 6:
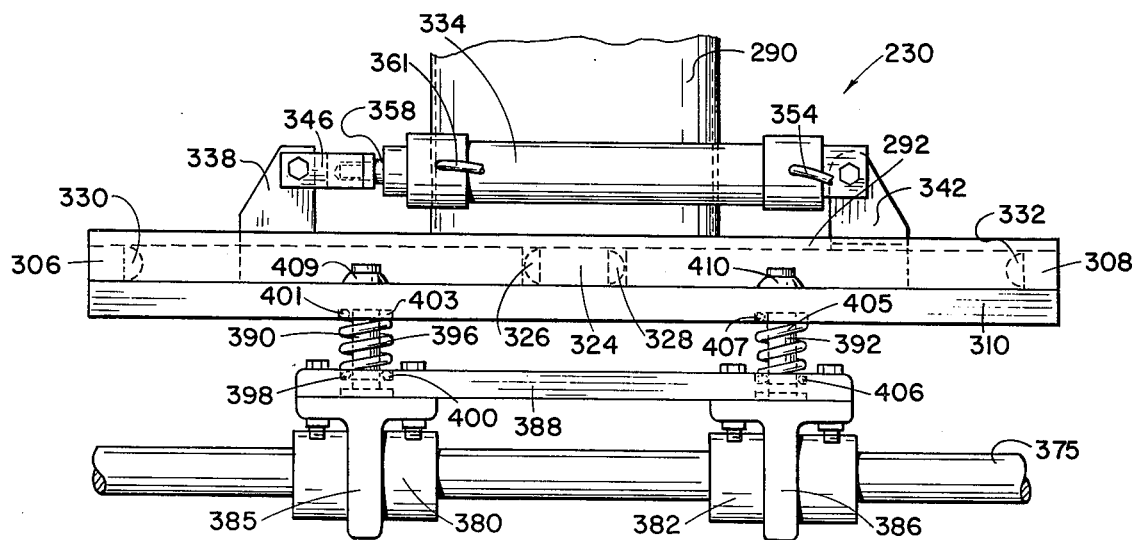
FIG. 6 is a side view of the hopper and hopper gate shown in FIG. 5 with the internal details revealed.

The hopper 230 will now be discussed in detail. The hopper as shown in FIGS. 5 and 6 has a section of basically elliptical (as discussed above) carrier tube 290 which extends in a substantially vertical direction upward from top plate 292. The hopper tube 290 is fitted onto a hole 294 in top plate 292. The attachment of the hopper tube to the top plate is by some standard method, for example, by welding. The uppermost portion of the hopper tube is provided with an outwardly curving lip 296 (FIG. 2). This lip will act generally as a funnel which allows the carrier 298 (as shown in FIG. 10) to fall from the incoming carrier tube into the hopper even though the incoming carrier tube and the hopper tube may be very slightly out of alignment. The outgoing tubes are also provided with an outwardly expanding lip 300, as shown in FIG. 2 on outgoing tube 240, to insure that the carrier will fall into the outgoing tube when the hopper gate (to be discussed in detail hereinafter) is opened.

The top plate 292 is in the shape of a cross and hole 294 is located in the center of the cross. Two arms 302 and 304 of the top plate 292 extend along the longitudinal axis to the edges of hopper 230 and are attached to spacer bars 306 and 308, respectively. Spacer bars 306 and 308 have a square cross sectional shape and are attached at the side opposite to top plate 292 to a bottom plate 310.

Two similar spacer bars 312 and 314, which run perpendicular to spacer bars 306 and 308, are attched to bottom plate 310. The spacer bars 312 and 314 are spaced inward from the edges of plate 310. The ends of spacer bars 306 and 308 are attached to spacer bars 312 and 314. The edges of the two remaining arms 316 and 318 of top plate 202 are attached to the top of spacer bars 312 and 314, respectively.

In the rectangular space thus created between top plate 292 and bottom plate 310, are located two rectangular slides 320 and 322. These rectangular slides act as a gate for the hopper. The rectangular slides, as shown in FIGS. 5 and 6 are in what will be referred to as the closed position even though they are spaced from one another. Two small rectangular blocks (only one of which, 324, is shown) extend from spacer bars 312 and 314 a short distance between top plate 292 and bottom plate 310 toward hole 294. The rectangular blocks (only 324 is shown) are of sufficient width that they plus the bumpers (only the bumpers 326 and 328 for rectangular block 324 are shown) will hold the rectangular slides apart in approximately the position shown in FIGS. 5 and 6. Spacer bars 306 and 308 are also provided with bumpers 330 and 332, respectively. The bumpers act as shock absorbers and prevent damage to the rectangular slides 320 and 322.

Extending upward from the rectangular slides are ears which are utilized by cylinders 334 and 336 (standard piston type hydraulic cylinders) for moving the rectangular slides. The ears can be attached to the rectangular slides by a variety of methods, for example, by screws or nuts and bolts which are countersunk. Rectangular slide 320 has ears 338 and 340, and rectangular slide 322 has ears 342 and 344. All of the ears are provided with suitable alignment holes. Cylinder 334 (to be discussed in detail hereinafter) is attached to ear 338 at its piston end, which is provided with a clevis 346, by passing a suitable bolt through the alignment holes in clevis 346 and ear 338, and tightening a nut on the threaded end of the bolt. The opposite end of cylinder 334 is provided with a nib 348. Nib 348 is provided with an alignment hole as is ear 342 and suitable nut and bolt is provided for tightening nib 348 to ear 342. Cylinder 336 is also provided with a clevis 350 and is attached to ear 340 in a manner similar to the attachment of ear 338 to clevis 346. The opposite end of cylinder 326 is provided with a nib 352 which is attached to ear 344 in a manner similar to the attachment of ear 342 to nib 348.

When hydraulic fluid under pressure flows through hydraulic conduits 354 and 356, the piston rods 358 and 360 (having clevis 346 and 350, respectively, attached thereto) will be forced outward from the cylinder 334 and 336, respectively. This will in turn move the rectangular slides 320 and 322 toward spacer bars 306 and 308 until bumpers 330 and 332 are engaged. The rectangular slides will no longer occupy any space adjacent to hole 294 and a carrier in the hopper tube 290 would be free to pass through the space previously occupied by the rectangular slides and through the basically elliptical (as described above) hole in bottom plate 310 provided for that purpose.

When it is desired to move the rectangular slide to the closed position, (as shown in FIGS. 5 and 6), hydraulic fluid under pressure is directed through hydraulic conduits 361 and 363 which will move piston rods 358 and 360, respectively, back into cylinders 334 and 336 until rectangular slides 320 and 322 engage bumpers 326 and 328 (and the bumpers on the opposite side which are not shown). The timing and the directing of the hydraulic fluid will be discussed in detail hereinafter.

The hopper 230 is associated with two rails or guide rods 375 and 377. Two sleeves encircle each of the guide rods. Only the sleeves 380 and 382 associated with guide rod 375 are shown in detail (FIG. 6). The sleeves are easily movable longitudinally along their associated guide rods. The guide rods are attached to the frame by some standard method and spaced therefrom. As shown in FIG. 2, the guide rods are welded to braces 383 and 384, respectively, (only the braces at one end are shown) which are attached to the beams of the frame. A clamp is provided for each sleeve for attaching it to a brace. Clamps 385 and 386 which encircle and hold the sleeves 380 and 382, respectively, are attached by some standard method, for example, by nuts and bolts, to a rectangular shaped brace 388. The sleeves are spaced inward from the edge of lower plate 310. The shock absorbers 270 and 272 are set so that they will contact a leading edge of bottom plate 310 and prevent damage to the hopper from contact with the frame.

Two rods 390 and 392 are attached onto brace 388 by some standard method, for example, by welding and extend upward through the alignment holes in plate 310 provided for that purpose. A helical spring 396 is coiled around the portion of rod 390 extending between rectangular brace 388 and plate 310. One end 398 of spring 396 is received in a countersunk opening 400 in rectangular brace 388, and the opposite end 401 of spring 396 is received in a countersunk opening 403 in plate 310. A similar helical spring 405 is coiled around the portion of rod 392 extending from rectangular brace 388 to plate 310. Countersunk openings 406 and 407 are provided in brace 388 and plate 310. Spherical balls (not shown), which are provided with suitable holes through the center, are placed over the upper ends of rods 390 and 392, respectively. Hollow spheres 409 and 410, with larger openings than the spherical balls, surround the spherical balls and form a bearing therewith. The hollow spheres are attached to bottom plate 310 in countersunk openings (not shown) in plate 310. Thus the hopper is mounted for resilient vertical movement but essentially restrained from any horizontal movement with respect to the sleeves 380, 382, etc. The springs 390 and 392 act a shock absorbers for the fall of carriers into the hopper for the rods 375 and 377. The hopper 230 is attached to rod 377 in a manner similar to the attachment of the hopper to rod 375 as discussed above.

The hopper is moved along rods 375 and 377 by a positioning apparatus. (The connections of the positioning apparatus to the hopper 230 are not shown in FIGS. 5 and 6.) The positioning apparatus as shown in FIGS. 3 and 4 is attached to plate 310. Each end of a wire rope or cable 415 has an anchor bolt, 418 and 419, attached thereto. Two mounting structures 422 and 423 are attached by some standard method, for example, by welding to the bottom plate 310 along the center line of the axis of movement (which is parallel to guide rods 375 and 377) of the hopper. This is the longitudinal axis of the hopper. Mounting structures 422 and 423 are provided with threaded holes (not shown in detail) which are the suitable size to receive the threaded ends of anchor bolts 418 and 419.

The cable 415 extends from anchor bolt 418 which is threaded into mounting structure 422 around pulleys 426 and 428 which are rotatably mounted onto L-shaped braces 432 and 434, respectively. Braces 432 and 434 are attached to said beam 274 by some standard method for example, by welding. Cross brace 436 gives added stability and strength to braces 432 and 434 to prevent any dislocation of pulleys 426 and 428. Braces 432 and 434 each have a triangular shaped piece between the arms of the L-shape.

Cable 415 extends from pulley 428 to a cable drum 440. The cable is wrapped several times around cable drum 440 in a helical manner. The windings of cable 415 around cable drum 440 are positioned so that the cable will remain on the drum when the hopper is in either of its extreme end positions. The cable drum 440 is provided with spirally winding grooves or indentations (not shown) which maintain the cable 415 in the proper position on the cable drum 440. After coming from pulley 428 and around cable drum 440 several times, the cable goes around another set of pulleys 444 and 445 which are attached rotatably to braces 447 and 449. Braces 447 and 449 are in turn attached to side beam 46 in a manner similar to the attachment of braces 432 and 434 to side beam 427. A cross brace 452 is attached to braces 447 and 449 in a manner similar to the attachment of cross brace 436 to braces 432 and 434. The cable 415 extends from pulley 445 to anchor bolt 419 which is threaded into mounting structure 423.

The portions of the cable extending from anchor bolt 418 to pulley 426 and from anchor bolt 419 to pulley 445 are parallel to guide rods 375 and 377 to allow the hopper 230 to be moved without binding on the guide rods. Thus, any movement of cable drum 440 will cause hopper 230 to be moved along the guide rods 375 and 377.

Cable drum 440 is rotatably mounted on top of a rectangular plate 456. Rectangular plate 456 is attached to a cross beam 458 by some standard method, for example, by long threaded bolts extending upward from the bottom part of beam 458 through alignment holes therein and through spacer sleeves 461, 462, and 463 and finally through alignment holes in the plate 456 with suitable nuts provided for tightening the plate 456, the spacer sleeves 461, 462, and 463 and beam 458 together.

A shaft 466 (only a portion of which is shown) extends through the cable drum 440 in a vertical direction along its rotary axis. The lower portion of shaft 466 is connected to the shaft of a hydraulic motor 470. The upper portion of shaft 466 extending from cable drum 440 is attached to the shaft (not shown in detail) of a potentiometer 474. The potentiometer is of a multiturn type so that the voltage output of the potentiometer is different for all of the possible positions of the hopper. The case of the potentiometer is attached to a plate 478 which is spaced from plate 456 and attached thereto by some standard method, for example, by threaded bolts extending upward through alignment holes in plate 456 through spacer sleeves 482 and 484 (and another spacer sleeve not shown) and with the threaded bolts being provided with a suitable nut for tightening the plate 478, the spacer sleeves, and plate 456 together. The function of the hydraulic motor and the potentiometer will be discussed in detail hereinafter.

The construction of slide gates 82 through 89 is substantially the same as that of gates 253 through 260. For the purposes of illustration, the construction of the slide gates for incoming tubes is shown in detail in FIGS. 7, 8 and 9. For example, incoming carrier tube 62 can be further defined as a basically elliptical (as discussed above) carrier tube section 490 fitted into a basically elliptical hole 492 in a top lamina 496 of the gate 82. The top lamina is a thin but rigid sheet of metal formed in a rectangular shape. Top lamina 496 is provided with a rectangular slot 508 (to be discussed in detail hereinafter) and is attached to the bottom thereof to two spacer bars 511 and 512 which extend the longitudinal length of top lamina 496 at sides thereof. Three cross spacer bars 516, 517 and 518 extend from spacer bar 511 to spacer bar 512. Spacer bars 516 and 518 are at the ends of top lamina 496, and spacer bar 517 is at the same end as spacer bar 518 but space therefrom toward slot 508. A second rectangular lamina 522, similar to the top lamina, is attached to the bottom of spacer bars 511, 512, 516, 517, and 518. Lamina 522 is also provided with a basically elliptical hole located below hole 492.

In the space between laminae 496 and 522 is located a rectangular slide 542 which occupies approximately one half of the longitudinal space (shown by dotted lines in FIG. 7) between spacer bars 516 and 517. The slide 542 is closely fitted between spacer bars 511 and 512, and laminae 496 and 522, but movable between the extremes of one end close to or touching spacer bar 516 and at the opposite end touching or almost touching spacer bar 517. The slide (constructed of some durable and shock absorbant material) is moved by means of a standard piston type hydraulic cylinder 528. The piston rod 532 of cylinder 528 is attached to a clevis 534. Slide 524 is provided with an ear 536 extending upward through slot 508 and is attached to clevis 534 by a standard method, for example, a threaded bolt 538 extending through alignment holes in the metal clevis 534 and ear 536 which is provided with a suitable nut 540 placed on the threaded end of bolt 538 for tightening the metal clevis and ear together.

An L-shaped bracket 544 is provided with a circular alignment hole through which the piston rod end of cylinder 528 is inserted. Bracket 544 is attached to lamina 496 and spacer bar 517 and bottom lamina 522 by some standard method, for example, by screws. Additional support for cylinder 528 is provided by an L-shaped clamp 546. The two sections of clamp 546 conform to the curvature of cylinder 528 and are provided with ears 550 and 552 which are juxtaposed around cylinder 528. Alignment holes are provided in the ears 550 and 552 and suitable nuts and bolts are provided for tightening clamp 546 around the cylinder. Clamp 546 is attached by some standard method to laminae 496 and 522 and spacer bar 518.

When it is desired to actuate the slide gate, assuming that the slide gate is in the open position (as shown in FIGS. 7 and 8) hydraulic fluid is directed (to be discussed in detail hereinafer) through hydraulic conduit 554 which causes piston rod 532 to move toward tube section 490. The movement of the piston rod causes the slide to occupy the space between the holes in laminae 496 and 522. This will prevent a carrier from moving out of the tube section 490 until hydraulic fluid is directed into hydraulic conduit 556 which forces piston rod 532 to move back into cylinder 528. The movement of the piston rod causes slide 524 to be moved toward cylinder 528 thus opening the space between the holes in laminae 496 and 522. FIG. 9 (a cross section of the gate along section 9-9) shows the close fitting of slide 524 between laminae 496 and 522, and space bars 511 and 512. The close fit will form a pressure seal when the gate is closed.

The tube section 490 of incoming tube 62 (which is representative of all incoming carrier tubes 62 through 69) is provided with access ports 561 and 563 which are circular and extend outward from the tube. Mounted on the access ports are sensor enclosures 566 and 568. These sensor enclosures include sensors (not shown) which are adapted to sense the presence of a carrier or other object of the tube above the gate. These sensors could be photo-electric, magnetic, etc., as would be well known to those skilled in the art. Connecters 570 and 572 (which can be electric wires, etc.) convey the output information from the sensors contained in the sensor enclosures. An airtight seal is provided between connecter 570 and sensor enclosure 566 and between connecter 572 and sensor enclosure 568. A further airtight seal is provided between access port 561 and sensor enclosure 566, and access port 563 and sensor enclosure 568. These seals are provided to maintain pressure in the carrier tubes. Similar sensors are also located in hopper tube 290.

Although the above description was made in relation to slide gate 82 and its associated incoming carrier tube 62, the contruction of the other slide gates 83 through 89 associated with incoming carrier tubes 63 through 69, respectively, is substantially similar. The slide gates 253 through 260 which are associated with outgoing carrier tubes 240 through 247, respectively, would be constructed in essentially the same manner as slide gate 82 although the slide gate would be inverted and a tube section would be attached into each hole in the laminae of the slide gate. Generally, sensors would not be necessary for the outgoing carrier tubes but could be included if desired.

The article carrier 298 (shown in FIG. 10) is a basically elliptically (as discussed above) shaped container with two basically elliptical nibs 580 and 582 which are constructed of a material for engaging the walls of the carrier tubes and forming a seal therewith. The body or trunk 584 is provided with a hinged door (not shown) for the placement and removal of articles therein.

A controller (not shown) of any of a number of types known in the prior art would receive the inputs from the sensors, and the destinations, i.e., the appropriate outgoing carrier tube, for each of the carriers. The controller could be provided with a memory to retain information concerning the desired outgoing carrier tubes. The controller would take the input information and send actuating signals to solenoid valves 201 through 216 and 609 (FIG. 11).

Figure 11:
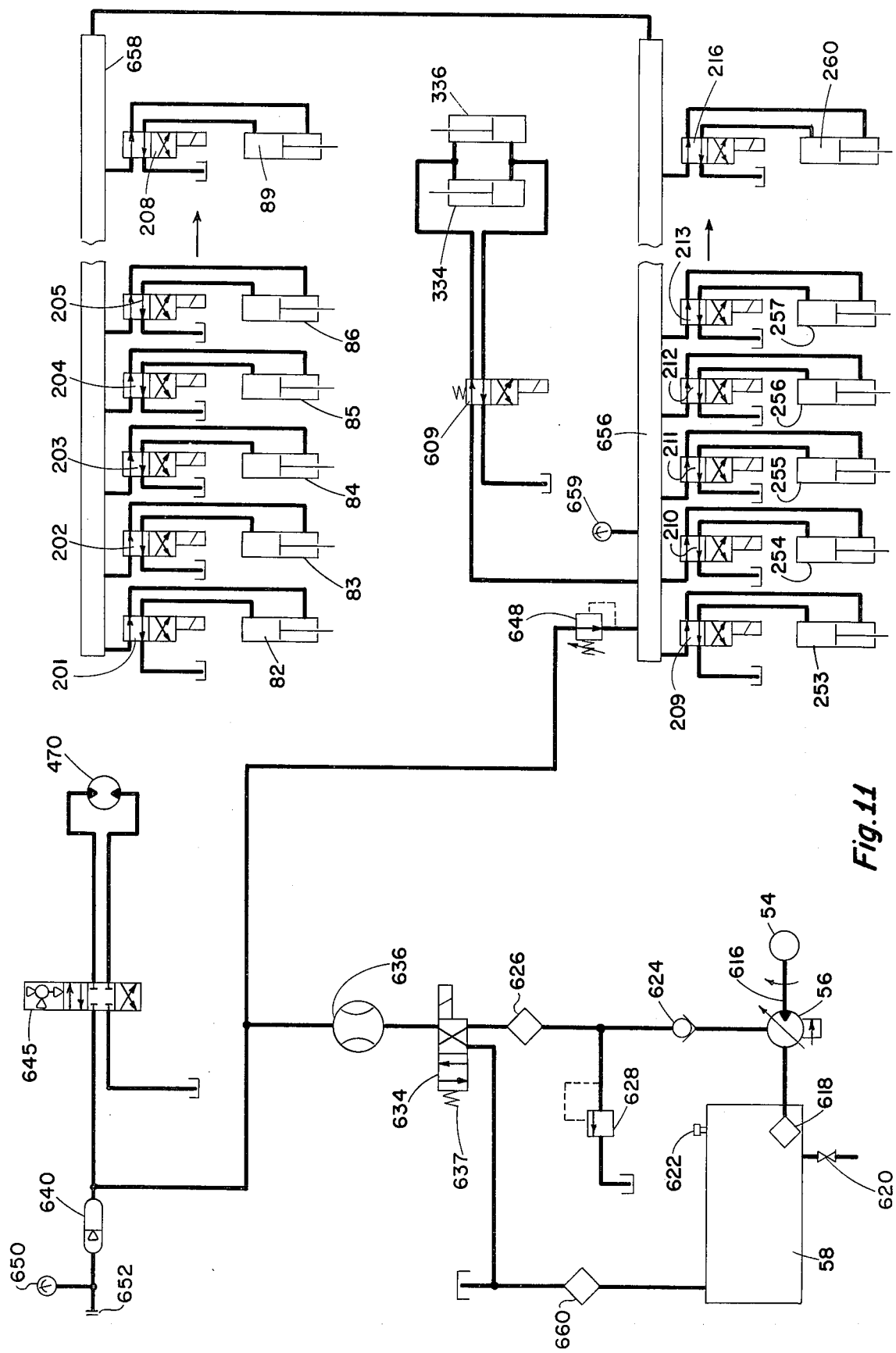
FIG. 11 is a hydraulic schematic of the positioning apparatus, the hopper gate, and the slide gates.

The hydraulic system, as shown in FIG. 11, shows the electrical motor 54 connected by a shaft 616 to compressor 56. Oil from oil storage tank 58 passes through a strainer 618 and is pressurized by compressor 56. The oil storage tank also has a drain 620 and a filler port 622 (for the addition of oil to the system) also provided with a strainer (not shown). The output of compressor 56 is fed through a check valve 624 which limits the flow of hydraulic fluid to one direction, i.e., away from the compressor. Check valve 624 is connected to pressure filter 626 and relief valve 628. The relief valve provides a bypass from the compressor to the oil storage tank 58. The relief valve 628 may be manually set to a certain pressure so that above that pressure the valve will open. This will prevent damage to the system from excessive pressure.

After the oil has passed through pressure filter 626, it passes through an emergency dump valve 634. When the system is operating properly, this valve, which is of the spring loaded solenoid type is held in its operating position (opposite to that shown in FIG. 11) which allows the oil to pass directly through emergency dump valve 634 to flow meter 636. When power is lost, the spring 637 will move the valve 634 to its dumping position (as shown in FIG. 11) which allows the oil under pressure present in the remainder of the system to drain to the oil storage tank 58; this prevents damage to the system. Flow meter 636 is connected to an accumulator 640, a directional valve 645 and a pressure reducer 648. The accumulator 640 provides a reservoir of oil under pressure for utilization by directional valve 645 for the purpose of driving hydraulic motor 470. The directional valve can direct hydraulic fluid to the hydraulic motor in either of two directions. The hydraulic motor will rotate, clockwise or counterclockwise, depending on the direction of the fluid flow. Accumulator 640 is connected to a pressure gauge 650 and a filler port 652. The filler port is provided to allow the addition of oil to the system and the gauge provides a readout so that the functioning of the system may be monitored.

Pressure reducer 648 is connected to a pressure manifold 656 which is in turn connected to another manifold 658 and a pressure gauge 659. These pressure manifolds are connected to various two position solenoid valves 201 through 208 and 209 through 216 (see also FIG. 1) and 609. These valves are connected to their respective cylinders which contain the piston rods for opening and closing the slide gates 82 through 89 and 253 through 260 (as discussed above) and the hopper gate. The return of the hydraulic system has a filter 660.

The operation of the article transfer system will now be discussed in detail. When the article carrier 298 is inserted into one of the various carrier tubes at a remote location, information on its destination is sent to the controller. After the carrier has arrived at the end of its respective tube, for example, carrier tube 63 (shown in FIG. 1), the sensors located at the end of that tube will send information concerning the presence of the carrier above the respective gate to the controller. In the above example, the gate would be gate 83. The controller would generate a signal directing the hopper to be positioned by the positioning apparatus beneath tube 63. The positioning is performed by some type of standard control system within the controller as known in the prior art. The control system, the cable 415, the hydraulic motor 470 and the directional valve 645 make up the positioning apparatus.

The multiturn potentiometer 474 is tied to the cable drum 440. Thus the output of the potentiometer in volts is directly related to the position of the hopper. This would provide information regarding the location of the hopper to the controller and the control system. The output of the control system would go to the directional valve 645 causing the directional valve to direct hydraulic fluid under pressure into one of two conduits connected to the hydraulic motor 470. The hydraulic motor will rotate clockwise or counterclockwise depending upon the conduit into which the hydraulic fluid is directed. The rotation of the hydraulic motor will rotate cable drum 440 in the proper direction for moving the hopper 230 in the proper direction. The control system will stop the hydraulic motor when the hopper has reached the proper location.

After the hopper 230 has been positioned by the control system, the controller will send a signal to the proper solenoid valve to activate the proper cylinder, and thus open the slide gate allowing the carrier to fall into the hopper tube. In the above example, the solenoid valve 202 would be actuated, and fluid under pressure would be directed to move the piston rod into the cylinder of slide gate 83. The solenoid valve 202 is shown in that position in FIG. 11.

After the sensor in the hopper tube has indicated to the controller that the carrier is therein or after the sensor in carrier tube 63 has indicated that the carrier is no longer present, the controller will actuate solenoid valve 202 (to the second position shown in FIG. 11) thus directing fluid under pressure into the cylinder moving the piston rod of slide gate 83 outwardly which will close the slide gate.

At the same time that slide gate 83 is being closed, the controller will generate a signal to the control system indicating the appropriate outgoing carrier tube for that carrier. For example, if it was desired to place the carrier in outgoing carrier tube 244, the directional solenoid valve would be actuated to direct the hopper to a position above outgoing carrier tube 244. Then, solenoid valve 213 would be actuated (to the position shown in FIG. 11) directing fluid under pressure into the cylinder of slide gate 257 thus directing the piston rod into the cylinder thereof. This will force open the slide gate. At the same time the controller will signal solenoid valve 69 to open the hopper gate by actuating cylinders 334 and 336. (This is the second position of solenoid valve 609. shown in FIG. 11.) The piston rods of cylinder 334 and 336 will move out of their respective cylinders, and thus the hopper gate will be fully opened allowing the carrier to drop through the bottom of the hopper into the tube 244 and through slide gate 257. The controller will, after it receives proper input from the various sensors indicating the carrier has fallen from the hopper, actuated solenoid valves 213 and 609 which will close slide gate 257 and the hopper gate. The system is then prepared for the hopper to be moved to another location upon the arrival of another carrier or if several carriers are already present, the hopper could be moved to whatever location is indicated by the controller, for example, on a first in first out basis, and transfer that carrier to the desired outgoing tube.

In FIG. 2, the shape of the outgoing carrier tubes 240 through 247 is shown in detail. The carrier would fall from the hopper 230 through top of tube 240 into the much larger longitudinal diameter portion 690. Pressure is then applied through port 692. After the tube has reached the smaller horizontal portion 694 of the carrier tube, the nibs 580 and 582 of the carrier 298 will contact the sides of the tube forming a seal, and the carrier will be moved through the tube by the pressure applied behind the carrier (or a vacuum could be applied in front of the carrier).

As shown herein the incoming carrier tubes, the outgoing carrier tubes, and the hopper are arranged in a single row; that is, the vertical center lines of the incoming carrier tubes and outgoing carrier tubes are located in the same (central) vertical plane; similarly the hopper is movable horizontally its vertical center line being maintained in this vertical plane. However, the carrier tubes could be placed in several rows with the hopper movable laterally as well as longitudinally within an area. The number of slide gates, incoming carrier tubes, and outgoing carrier tubes is shown as eight, but the number could be easily increased or decreased as desired. Furthermore, one of the outgoing carrier tubes could lead to another similar transfer system. The hydraulic system as shown above could be replaced by a pneumatic system or by a totally electrical system utilizing electrical motors to move the slide gates and an electrical servo motor to provide the drive for the hopper through the same type of linkage or through various other types of linkages. Further, the shapes of the carriers, hopper tube, and the incoming and outgoing carrier tubes must be similar for a particular system but systems could be constructed with any of a number of shapes, for example square or circular.

SUMMARY OF THE OPERATION

A carrier is inserted into one of the variety of incoming carrier tubes. That carrier will travel through the tube propelled by pressure applied behind the carrier or a vacuum applied in front of the carrier. The carrier will arrive in the vicinity of the hopper where it will fall by gravity onto the top of the slide of the respective slide gate for that tube. A controller will receive sensory inputs from that tube indicating that a carrier is present and the hopper will be moved beneath the carrier and the slide gate will be opened, allowing the carrier to fall into the hopper tube and rest on the hopper gate. The hopper will then be moved to a position above the proper outgoing gate and the slide gates of the outgoing carrier tube and hopper will be opened. This will allow the carrier to fall from the hopper tube into the outgoing carrier tube. Pressure will then be applied behind the carrier and the carrier will be propelled along the carrier tube to its destination.

Whereas the present invention has been described in particular relation to the drawings attached hereto, it should be understood that other and further modifications, apart from those shown or suggested herein, may be made within the spirit and scope of this invention.

What is claimed is:

1. An article transfer system for transferring an article carrier from one carrier tube to another comprising: a frame defining an upper horizontal plane and a lower horizontal plane spaced below said upper horizontal plane; a plurality of incoming carrier tubes for the movement of carriers therein towards said frame, each incoming carrier tube having an end located in said upper plane and being provided with a slide gate for selectively opening said end; a vertical hopper positioned between said planes having an open upper end for receiving a carrier therein and having a hopper gate at the bottom end thereof for opening said hopper for allowing said carrier to fall from said hopper; means for selectively moving said hopper horizontally to predetermined positions between said planes; the opening of a given slide gate allowing a carrier to fall into said hopper when said hopper is positioned beneath the associated incoming carrier tube having a carrier therein; a plurality of outgoing carrier tubes for the movement of carriers therein away from said frame, each outgoing carrier tube having an end located in said lower plane and being provided with a slide gate for selectively opening said end of said outgoing carrier tube allowing said carrier to fall thereinto from said hopper when said hopper gate is opened and when said hopper is positioned above its associated outgoing carrier tube.

2. An article transfer system as set forth in claim 1 wherein said upper end of said hopper is provided with an outwardly curving lip for funneling said carriers from said incoming carrier tubes into said hopper.

3. An article transfer system as set forth in claim 1 wherein each of said ends of said outgoing carrier tubes is provided with an outwardly curving lip for funneling said carriers from said hopper into said outgoing carrier tube.

4. An article transfer system as set forth in claim 1 wherein said hopper includes a vertical tube open at said upper end for receiving a carrier therein, a top plate attached horizontally at bottom end of said vertical tube and provided with a hole below said vertical tube, a plurality of spacers attached to bottom of said top plate surrounding and spaced from the hole in said top plate, and a bottom plate attached to bottom of said spacers forming an enclosed space and providing with a hole beneath the hole in said top plate; and wherein said hopper gate includes a first slide and a second slide, each slide slideably fitted into a portion of said enclosed space, said slides being movable towards each other to obstruct the opening formed by said holes and being movable away from each other to leave said opening unobstructed, and means for selectively moving said first and second slides towards and away from each other.

5. An article transfer system as set forth in claim 4 including a compressor for supplying fluid under pressure; and wherein said top plate includes a first slot and a second slot located adjacent a first side of said vertical tube over said first slide, and a third and fourth slots located adjacent to a second side of said vertical tube opposite said first side thereof over said second slide; and wherein said means for moving said first and second slides includes a fifth conduit and a sixth conduit for conducting said fluid under pressure, a valve connected to said compressor and said fifth and sixth conduits having a first and second position, said first position for directing said fluid into said fifth conduit, said second position for directing said fluid into said sixth conduit, a first cylinder with closed ends attached to said first slide through said first slot and said second slide through third slot and connected to said fifth and sixth conduits, a second cylinder attached to said first slide through second slot and said second slide through said fourth slot and connected to said fifth and sixth conduits, each cylinder including a piston responsive to the fluid from said fifth conduit by moving in a closing direction and to the fluid from said sixth conduit by moving in an opening direction, a first piston rod extending through one end of said first cylinder and attached to said piston of said first cylinder and said first slide for moving said first slide, another end of said first cylinder opposite said one end thereof attached to said second slide for moving said second slide, a second piston rod extending through one end of said second cylinder and attached to said piston of said second cylinder and said first slide for moving said first slide, another end of said second cylinder opposite said one end thereof attached to said second slide for moving said second slide.

6. An article transfer system as set forth in claim 1 wherein each slide gate of said incoming and outgoing carrier tubes comprises top lamina provided with a hole aligned with the interior opening in said tube, a plurality of spacer bars attached to one side of said top lamina encompassing the hole therein, a lower lamina provided with a hole similar to the hole in said top lamina and spaced from said top lamina by said spacer bars attached thereto with the hole in said top lamina aligned with the hole in said lower lamina, a slide slideably fitted into the area between the spacer bars and selectively movable into the space between the hole in said top lamina and the hole in said lower lamina for opening and closing said slide gate and means for selectively moving said slide for opening and closing said slide gate attached to said slide for allowing said carrier to fall therethrough.

7. An article transfer system as set forth in claim 6 including a compressor for supplying fluid under pressure; and wherein said top lamina is provided with a slot; and said means for moving said slide includes a third conduit for the conduction of fluid, a fourth conduit for the conducting of fluid, a valve connected to said compressor and said third and fourth conduits having a first and second position, said first position for directing said fluid into said third conduit and said second position for directing said fluid into said fourth conduit, a cylinder with closed ends attached to said top lamina and connected to said third and fourth conduits, and including a piston responsive to the fluid from said third conduit for moving in a closing direction and responsive to the fluid from said fourth conduit for moving in an opening direction, a piston rod extending through an end in said cylinder and attached to said piston and said slide for moving said slide for opening and closing said slide gate when said valve directs fluids into said third and fouth conduits.

8. An article transfer system as set forth in claim 6 wherein said slide fits closely with said top and lower lamina for forming a substantially airtight seal between its associated carrier tube and ambient air when said slide gate is closed.

9. An article transfer system as set forth in claim 1 wherein the center lines of said incoming carrier tubes and said outgoing carrier tubes are within a vertical plane, and the center line of said hopper is movable within said vertical plane.

10. An article transfer system as set forth in claim 9 including a plurality of horizontal rods attached to said frame and parallel to said vertical plane, each rod having both ends thereof attached to said frame; and wherein said hopper includes a plurality of sleeves encircling said rods for the movement of said hopper parallel to said rods.

11. An article transfer system as set forth in claim 10 including a plurality of shock absorbers attached to said frame and extending inwardly therefrom, and engagable with said hopper for stopping said hopper to prevent said hopper from engaging said frame resulting in damage thereto.

12. An article transfer system as set forth in claim 10 wherein said frame includes a first side adjacent one end of said rods and a second side adjacent another end of said rods opposite to said one end thereof, and wherein said means for moving said hopper includes a first pulley rotatably mounted on said first side of said frame adjacent said vertical plane, a second pulley rotatably mounted on said second side of said frame adjacent said vertical plane; a cable having a pair of ends; a first end of said cable lying within said vertical plane and attached to said hopper, and a second end of said cable lying within said vertical plane and attached to said hopper at a location opposite from the attachment of said first end of said cable thereto; a cable drum rotatably mounted on said frame for winding said cable thereon, and wherein said cable passes from said first end thereof around said first pulley to said cable drum and from said second end thereof around said second pulley to said cable drum.

13. An article transfer system as set forth in claim 12 including a compressor for supplying fluid under pressure and wherein said cable drum is rotatable in a first rotary direction and a second rotary direction opposite to said first rotary direction, and said means for moving said hopper includes a directional valve connected to said compressor for selectively directing fluid in a first and second direction, a motor attached to said cable drum for the rotation thereof and responsive to said fluid directed in said first direction for rotating said cable drum in said first rotary direction and said fluid directed in said second direction for rotating said cable drum in said second rotary direction.

14. An article transfer system for transferring an article carrier from one carrier tube to another comprising: a frame defining a first plane, and a second plane located below and substantially parallel with said first plane; a plurality of incoming carrier tubes for the movement of said carrier therein towards said frame, each incoming carrier tube having an end located in said first plane and being provided with a slide gate for selectively opening said end; a hopper positioned between said planes having an open end for receiving a carrier therein and having a hopper gate at an end opposite to said open end thereof for opening said hopper allowing said carrier to descend out of said hopper, means for selectively moving said hopper to predetermined positions between said planes; the opening of a given slide gate of a given incoming carrier tube having a carrier therein allowing said carrier to descend into said hopper when said open end of said hopper is aligned with said end of said given incoming carrier tube; a plurality of outgoing carrier tubes for the movement of carriers therein away from said frame, each outgoing carrier tube having an end located in said second plane, and being provided with a slide gate for selectively opening said end of said outgoing carrier tube allowing said carrier to descend thereinto from said hopper when said hopper gate is opened and when said hopper gate is aligned with said end of said outgoing carrier tube.

15. An article transfer system as set forth in claim 14 wherein said end of said incoming carrier tube has an opening of a given size, and said open end of said hopper has an opening of a size greater than said given size for funneling said carrier from said incoming carrier tube into said hopper.

16. An article transfer system as set forth in claim 14 wherein said opposite end of said hopper has an opening of a given size, and the end of said outgoing carrier tube has an opening of a size greater than said given size for funneling said carrier from said hopper into said outgoing carrier tube.

17. An article transfer system as set forth in claim 14 wherein each slide gate of said incoming and outgoing carrier tubes comprises a top lamina provided with a hole aligned with the interior opening in said tube, a pluarlity of spacer bars attached to one side of said top lamina encompassing the hole therein, a lower lamina provided with a hole similar to the hole in said top lamina and spaced from said top lamina by said spacer bars attached thereto with the hole in said top lamina aligned with the hole is said lower lamina, a slide received in the area between the spacer bars and selectively slidably movable into the space between the hole in said top lamina and the hole in said lower lamina for opening and closing said slide gate, and means for selectively moving said slide for opening and closing said slide gate attached to said slide for allowing said carrier to fall therethrough.

18. An article transfer system as set forth in claim 17 wherein said slide fits closely with said top and lower lamina for forming a substantially airtight seal between its associated carrier tube and ambient air when said slide gate is closed.

19. An article transfer system for transferring an article carrier from one carrier tube to another comprising: a frame having an upper horizontal beam structure and a lower horizontal beam structure spaced below said upper horizontal beam structure; a plurality of incoming carrier tubes for the movement of said carriers therein towards said frame, each incoming carrier tube having an end attached to said upper beam structure; a vertical hopper positioned between said beam structures having an open upper end for receiving a carrier therein and having a hopper gate at the bottom end thereof for opening said hopper for allowing said carrier to fall from said hopper, means for selectively moving said hopper horizontally to predetermined positions between said beam structures; means associated with each incoming carrier tube for controlling the departure of said carriers from said ends of said incoming carrier tubes individually for allowing a carrier to fall into said hopper when said hopper is positioned beneath a given incoming carrier tube having said carrier located therein; a plurality of outgoing carrier tubes for the movement of carriers therein away from said frame, each outgoing carrier tube having an end attached to said lower beam structure for allowing said carrier to fall thereinto from said hopper when said hopper gate is opened and when said hopper is positioned above said outgoing carrier tube and wherein said means associated with each incoming carrier tube comprises a slide gate attached to each incoming carrier tube for selectively opening said end thereof.

20. An article transfer system as set forth in claim 19 wherein each slide gate includes a top lamina provided with a hole aligned with the interior opening in said incoming carrier tube and located adjacent to said end thereof, a plurality of spacer bars attached to one side of said top lamina encompassing the hole therein, a lower lamina provided with a hole similar to the hole in said top lamina and spaced from said top lamina by said spacer bars attached thereto with the hole in said top lamina aligned with the hole in said lower lamina, a slide received in the area between the spacer bars and selectively slideably movable into the space between the hole in said top lamina and the hole in said lower lamina for opening and closing said slide gate attached to said slide for allowing said carrier to fall therethrough.

* * * * *